United States Patent [19]

Levanto et al.

[11] Patent Number: 5,175,758
[45] Date of Patent: Dec. 29, 1992

[54] CELLULAR TELEPHONE SYSTEM INTEGRATED WITH PAGING NETWORK

[75] Inventors: Lauri Levanto, Märynummi; Jukka T. Ranta, Salo, both of Finland

[73] Assignee: Nokia Mobile Phones Ltd., Salo, Finland

[21] Appl. No.: 579,814

[22] Filed: Sep. 4, 1990

[30] Foreign Application Priority Data

Sep. 15, 1989 [FI] Finland ............................... 894371

[51] Int. Cl.⁵ ............................................. H04M 11/00
[52] U.S. Cl. ....................................... 379/57; 379/59; 379/63
[58] Field of Search .................... 379/57, 60, 61, 58, 379/63, 56, 59; 455/33, 56

[56] References Cited

U.S. PATENT DOCUMENTS

| | | | |
|---|---|---|---|
| 4,000,610 | 3/1989 | Focarile et al. | 379/57 |
| 4,178,476 | 12/1979 | Frost | 379/57 |
| 4,392,242 | 7/1983 | Kai | 455/33 |
| 4,661,972 | 4/1987 | Kai | 379/56 |
| 4,748,655 | 5/1988 | Thrower et al. | 379/57 |
| 4,916,728 | 4/1990 | Blair | 379/59 |
| 4,988,991 | 1/1991 | Motegi | 379/57 |

FOREIGN PATENT DOCUMENTS

| | | | |
|---|---|---|---|
| 0212761 | 3/1987 | European Pat. Off. | 379/61 |
| 0310379 | 4/1989 | European Pat. Off. | 379/60 |
| 0183223 | 7/1989 | Japan | 379/57 |

OTHER PUBLICATIONS

Article: Financial Times, "Designs on pocketing the cellular market", by Geoffrey Charlish, Dec. 11, 1987.

*Primary Examiner*—Curtis Kuntz
*Assistant Examiner*—Dwayne D. Bost
*Attorney, Agent, or Firm*—Darby & Darby

[57] ABSTRACT

A telephone system with which a connection between two subscribers can be established, at least one of them being a mobile subscriber. The system includes a paging network composed of one or several extensive paging ranges, each of them having a paging transmitter (H1, H2) of its own, a small cellular network with an exchange and a plurality of base stations (T), and mobile telephones with which a pager has been integrated. When calling a mobile telephone, the transmitter of the paging range in which the telephone is known or assumed to be transmits a paging message to the telephone, whereby, when the telephone is in the neighborhood of the base station, the exchange of the cellular network establishes immediately a connection between the subscribers. No paging calls are lost because they are stored in the exchange of the cellular network, and on an appropriate occasion the pager of the telephone and the exchange compare the paging messages stored in the memories. The call can be transmitted from one base station to another during the call (handover).

19 Claims, 3 Drawing Sheets

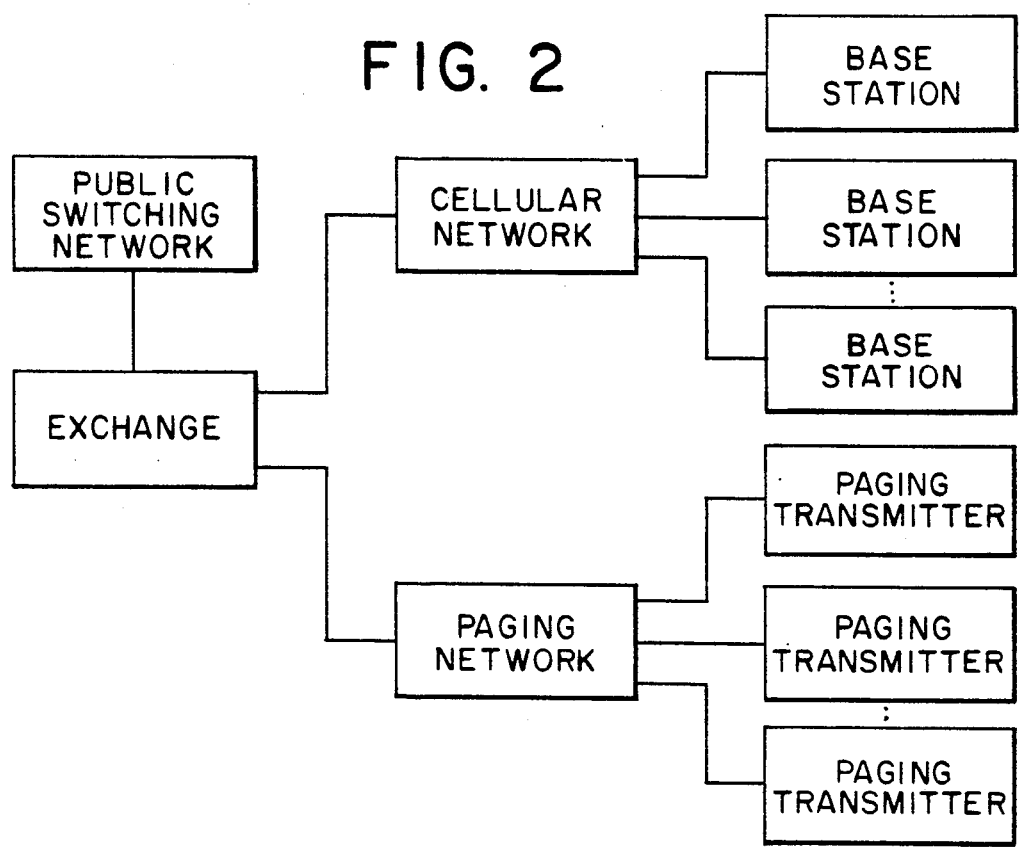
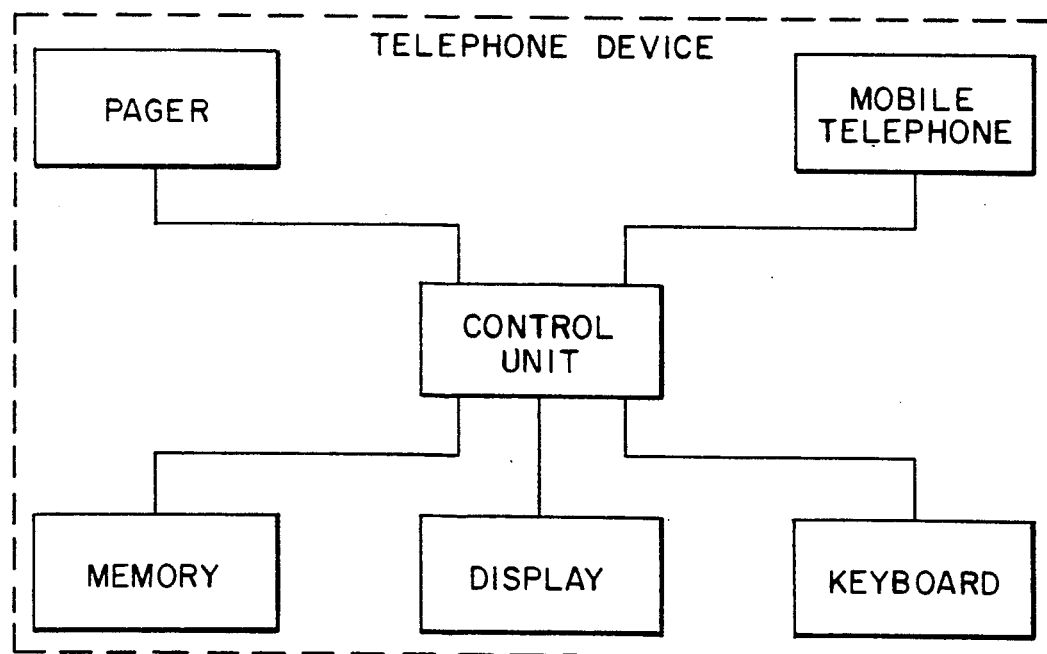

1

CELLULAR TELEPHONE SYSTEM INTEGRATED WITH PAGING NETWORK

BACKGROUND OF THE INVENTION

The present invention relates to a telephone system with which a connection can be provided between two subscribers, at least the telephone of one of them being a portable low-powered radio telephone.

The paging system is a widely employed system in which using a rather powerful signal emitted from a fixed paging exchange a person possessing a radio pager is alerted and a short message, ordinarily a call request or a telephone number, is stored in the pager memory. The person may then dial that number using either a wire-connected telephone of the public switching network or a mobile telephone. The paging service is typically regional, based on various media designs operating in the USW (Ultra Short Wave) band or with the base stations. The essential feature of the system is that the message transmission is one-way, from the exchange to the paging device. The pager is thus a small receiver in which the current consumption can be kept minimal. The power supply may be spared by switching the receiver on only periodically, provided that the messages in the transmission system concerning a given pager are transmitted at regular intervals.

In the cellular radiotelephone system of prior art the transmission of message is bidirectional and therefore, a connection has to be set up between the A subscriber and the B subscriber. In the traditional cellular system the exchange, or base station, is all the time informed of the location of all those telephones to which a call can be directed. When the system covers a wide area, this is an efficient way. If a mobile travel telephone frequently gets out of the reception range of the base stations, or moves frequently from one area of the base station to another, as the case is in a small cellular network, the reporting obligation of the telephones becomes a considerable load on the network, and this requires a quite high cost computer network in the system. In this kind of system the telephone must also be switched on continuously, which of course is power consuming.

Such systems are also known in the art in which the telephones are not continuously registered; instead, they are registered only when a call is made from the mobile telephone. In such a system incoming calls cannot usually be directed to the mobile telephone. For instance, the so-called Telepoint system is a system of this kind, in which so-called cordless telephone are used, from which a call can be made at a certain distance, e.g. 100 m, from any fixed station. The telephones are lightweight and small in size, fitting in a pocket, but it is usually not possible with this telephone to receive a call anywhere but within the area of a specified home base station.

In the EP patent application No. 0212761, a system is disclosed in which a cordless telephone and a paging device system are combined, making use as extensively as possible of existing systems, whereby remarkable expenditure savings are achieved. Said system comprises a paging network which can be accessed from the public telephone network, and a number of fixed, geographically spread, stations connected to the public switching network and containing a transmitter/receiver, and a number of cordless telephones which may through a fixed station enter connection with the public network. The power of the cordless telephones is 10 mW. The cordless telephone is provided with a pager to which a message, ordinarily a telephone number, can be transmitted via a paging network. The pager is provided with a memory in which a plurality of paging messages can be stored. When making a call from a cordless telephone to a telephone in the public switching network, the caller goes to the neighbourhood of a fixed station, and, if necessary, tunes to the frequency thereof and makes the call in the normal way. When a subscriber of the public telephone network calls a cordless telephone, he dials the paging number of this telephone (which at the same time is the address number of the telephone), hangs-up his telephone and waits. The paging exchange transmits through the transmitters of the paging stations the number of the cordless telephone and the subscriber's telephone number to all paging receivers. The pager of the particular cordless telephone then alerts and the subscriber's telephone shows up in the display. The user of the cordless telephone will now approach the nearest unoccupied fixed station and call the number of the subscriber. This may also take place automatically in that the cordless telephone automatically transmits the number of the calling subscriber if the telephone is within the range of a fixed station. When a call is made from one cordless telephone to another, the A subscriber dials in the vicinity of a fixed station the number of the B subscriber. The station adds thereto its own identification and transmits the numbers to the exchange of the public network which in turn transmits them to the paging exchange, which thereupon transmits the numbers via the paging stations to all paging receivers. The respective device alerts and the B subscriber calls the number of the A subscriber shown in the display. For the connection to be successful, the A subscriber must during this time be within the range of that station where he initiated the call, and remain connected to it because the response call of the B subscriber will be routed to this particular station.

The system disclosed in the EP patent application No. 0212761 cited above is encountered by a number of shortcomings, such as the following:

The paging exchange transmits the paging message through the paging stations simultaneously throughout its network because the location of the telephone is not known. The fixed station, that is, the base station has only one channel which must be maintained engaged for location detection when calling from one telephone to another. The paging messages are stored in the paging receiver, which results in losing the message if the paging receiver is not switched on or if it is outside the search range. When the incoming call cannot be put through the system, the call is replaced with an automatically dialed response call. A call between two mobiles implies that the calling telephone is locked on to the fixed station from which the call was initiated. Therefore, the mobility is limited to the immediate vicinity of said fixed station.

SUMMARY OF THE INVENTION

The above drawbacks can be eliminated with the paging cellular telephone system of the invention. The system is characterized in that the paging network consists of one or several extensive paging ranges, each possessing a paging transmitter of its own, the paging message being transmitted only within one paging area, and that the fixed stations are base stations serving a plurality of users of the small cellular network, said small cellular network having an exchange which takes care of control of the telephone traffic and in the memory of which the paging messages are stored, and that the mobile telephones are low-powered radio telephones comprising a pager, which most advantageously is provided with a joint display, keyboard, control unit and memory together with the radio telephone.

The telephone used in the system is of the same type as that disclosed in the EP patent application No. 0212761. The telephone comprises a pager and a low-powered radio telephone (e.g. a Telepoint telephone). The pager and the telephone make use of the same display, keyboard, memory, control unit and other appropriate components. The pager may receive messages, that is, typically call requests in the form of telephone numbers, which are stored in the memory of the telephone. From there they can be read or used directly for short dialing control. The setting-up of a connection to a number delivered by the pager can be automatic and it may take place immediately if acting within the Telepoint range. As observed by the user, the situation seems to be same as if when he is answering a telephone call. A mobile subscriber is able to receive a call anywhere within the Telepoint range. A call to a mobile subscriber in the Telepoint range may be formed as an automatic response call or it may remain a call request if the called number is occupied or if the called number is outside the range of the base station, or if so desired by the called number.

The system of the invention is based on a cellular network and a paging network. A speech channel and a call channel are used in the cellular network. A paging channel is in use in the paging network. It is essential that the paging network is extensive and covers the entire area in which the telephones move, whereby the telephone can always be reached whereas the cellular network is constructed to be cover a more limited area, whereby it is not possible to call from the telephone to any station, rather calls can only be established in the neighbourhood of the base station.

The base stations of the cellular network may constitute a cellular small network or a micro network in cities and in densely populated areas, whereas in the countryside the base stations can be placed appropriately along roads, e.g. at intervals of 15 to 30 minute drives. The base stations may serve several mobile telephones. If the receipt ranges of the base stations are partly overlapping, the mobile telephone may move from one range of one base station to another during the call, in other words, it may execute a so-called handover. This can be carried out using procedures employed in the systems known in the art. The receipt ranges of the base stations do not necessarily cover the entire range within which the telephones move. In the present instance when the receipt ranges are not overlapping, no handover measure can be carried out, whereby the telephone gives e.g. a warning sound when the signal of the base station becomes weaker. The powers of the base stations are small because the transmission power used by the telephones is intended to be kept low in order to minimize their current consumption and price.

The paging system covers the whole operation range. Each paging range is provided with a high-powered transmitter and an individual paging geographical area is extensive, its radius being e.g. 400 km, whereby its purpose is to cover the entire area within which the telephone is assumed to move. Therefore, the moving of a mobile telephone from one paging range to another is an exception. If a paging range changes, this can be carried out either manually or automatically. While in manual operation, the telephone gives a warning of its departure from the paging range and it can be updated in a new paging range at a first Telepoint point e.g. by pressing the registration button placed on the telephone. The paging calls made before the registration are transmitted in the old paging range but they remain in the memory of the exchange. In automatic operation, entry in a new paging range takes place when the telephone has lost the signal of the original paging range, or the signal has become weaker, below a given threshold level, and the telephone has found a signal of a new strong paging station. Since it is feasible that in conjunction with the change of the paging range, or for some other reason, the telephone does not receive all paging messages, the messages in the memories of the telephone and the system are compared to ascertain potentially undelivered paging messages from the system in association with registering in a new paging range, and the base station of the cellular network system transmits the potentially undelivered paging messages to the telephone, and thereafter clears said memory area of the cellular network system. A paging channel is time-divided, whereby the paging receiver of the telephone need not be continuously switched on. With the information delivered by the paging channel a code of the paging range is connected in an appropriate manner so that the telephone is able to receive it together with the messages and to record from which paging range the messages are transmitted at any one moment.

Since the system is not informed if the telephone receives the paging messages, it stores all paging messages in the exchange of the cellular system and repeats their transmission at appropriate intervals. When the telephone enters the area the next time, when a call is made or received, the telephone and the system compare the messages received by the telephone and the messages stored by the system, and the system transmits the messages not included in the telephone to said telephone along the call channel and thereafter clears the storing memory.

The telephone operates in the system of the invention as follows:

When a telephone is switched on, it is set to listen to a paging signal of the paging station to which it had been listening before being switched off. If the paging range is the same as before, as it normally is, no other operations are needed. If the paging range changes, the telephone receives no calls before it is updated for a new paging range. (Roam state).

When the telephone is switched off, it will not inform the system thereof. The system transmits the paging messages within the paging range in which it last recognized the telephone.

When a call is made in a telephone, the telephone transmits a message using a call channel containing the requisite data for establishing a call. When a connection with the B subscriber is received, the base station informs the telephone of the speech channel to which the telephone should change immediately and in which the speech signal will be transmitted. The base station recognizes the end of the call either in that the B subscriber terminates the call, or in that it no longer receives a signal transmitted by the telephone of the A subscriber in the speech channel.

Normally, a call is made to a telephone in that an A subscriber dials the number of the telephone. The exchange transmits a paging message to the telephone of a B subscriber. If the telephone is within the receipt range of the base station when receiving the paging call, it sets up a connection between the A and the B subscribers. If the A subscriber hangs up his telephone before making a connection with the B subscriber, the call will be cancelled in normal way. As regards the exchange, establishing a receiving call is not necessarily different from a transmitted call in any other way but in that when a mobile receives a connection, the exchange recognizes that an incoming call is waiting, whereby the telephone is connected thereto.

If an A subscriber does not want to wait for a connection to be established, he may key in a paging message, hang up the telephone and wait for a response call. The exchange may automatically give instructions to the A subscriber concerning the paging message. For facilitating the delivery of the paging message, the system may be provided with a special code, with which the telephone number becomes the paging message from which the A subscriber is calling.

A connection between two telephones within the system is so established that a call of the A subscriber starts as a paging message and after the B subscriber gives a response, a connection will be coupled.

The speech channels of the system may be analog or digital.

BRIEF DESCRIPTION OF THE DRAWING

The operation of the system of the invention is described below referring to the accompanying drawing.

FIG. 2 shows a block diagram of the telephone system of FIG. 1.

FIG. 3 shows a block diagram of a telephone device comprising a control unit, memory, display and keyboard and which is jointly used by a pager and a mobile telephone.

DETAILED DESCRIPTION

Big circles present the receipt ranges of the paging transmitters H1 and H2 and the small circles the receipt ranges of the base stations T.

Figure 1:
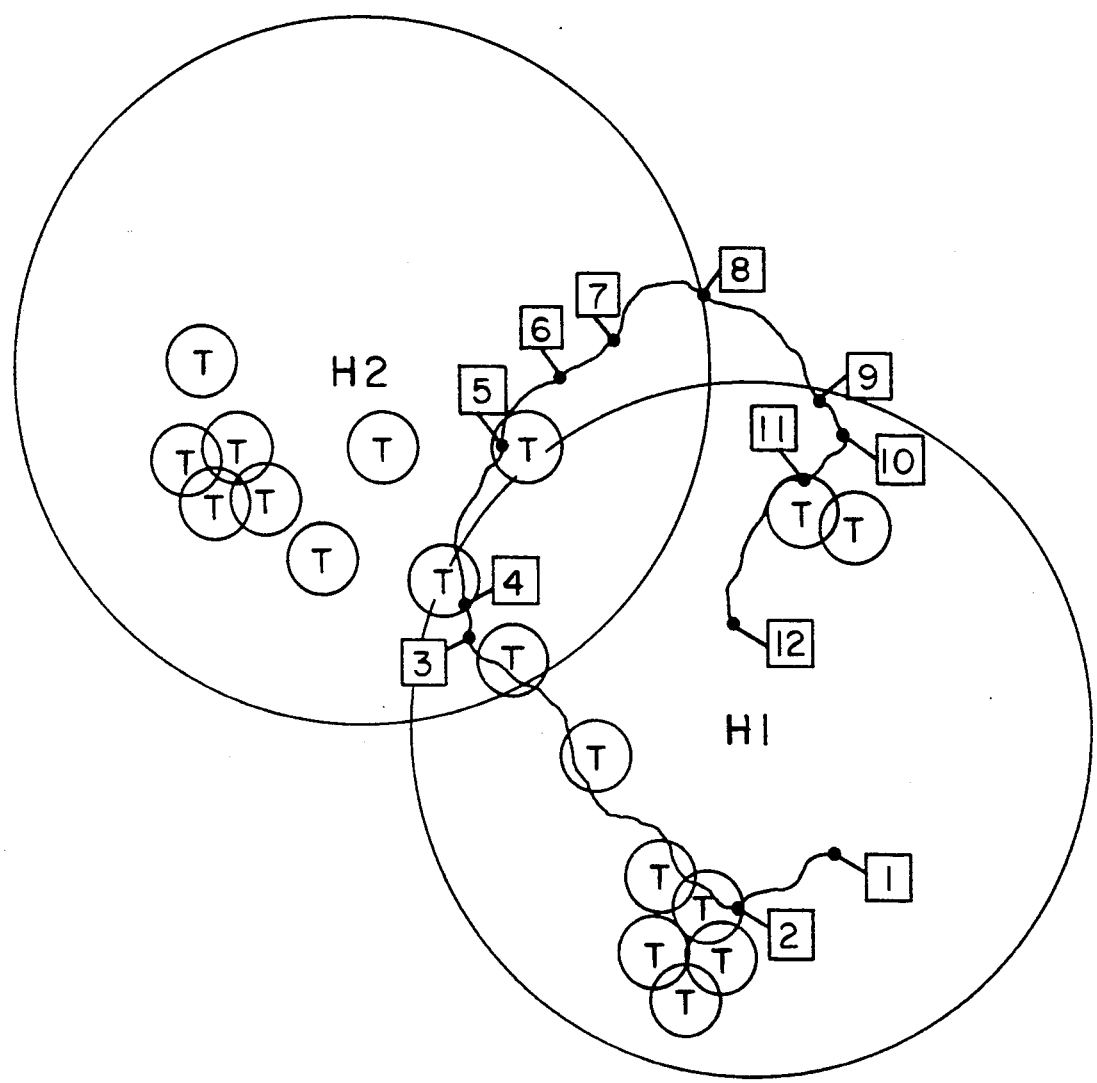
FIG. 1 shows a schematic representation of receiving ranges of a telephone system in accordance with the invention.

The travelling route of the telephone is depicted in the FIGURE with a line. Referring to FIG. 1, the numbers inside the squares relate to various events which are described below. It is entirely based on such operational mode of the telephone in which the telephone is always registered automatically.

FIG. 2 shows the telephone system having an exchange connected to a public switching network, a cellular network and a paging network. The cellular network includes a plurality of base stations and the paging network includes at least two paging transmitters. The cellular network transmits telephone calls between telephone devices of users. One such telephone device includes a control unit, memory, display and keyboard as illustrated in FIG. 3.

Figure 4:
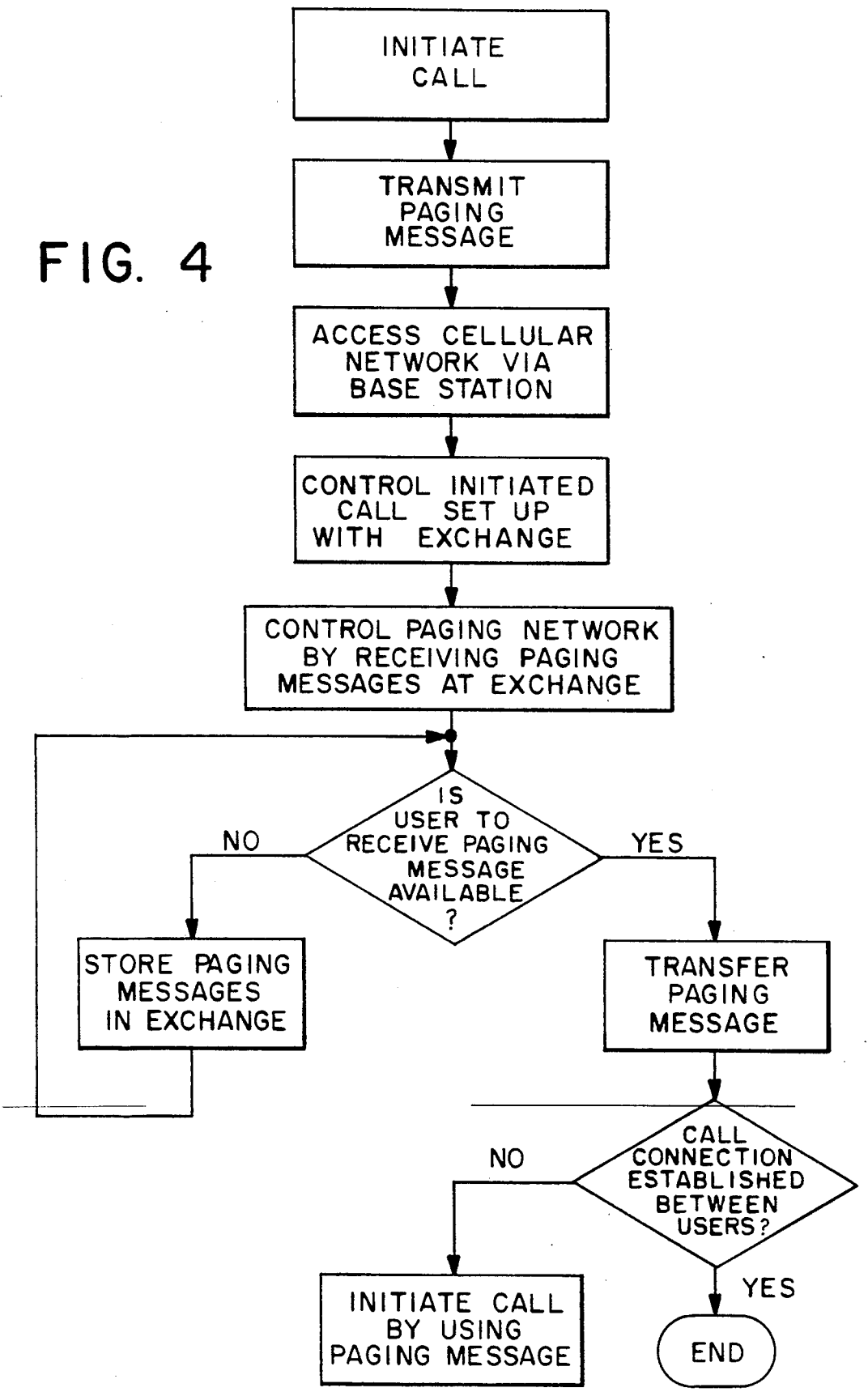
FIG. 4 shows a flow diagram representative of the method of operation of the telephone system of the present invention.

FIG. 4 depicts a flow diagram showing a manner of operation of the telephone system by users. A more detailed description is as follows:

(1) The user switches the telephone on. It will immediately start to receive the potentially incoming paging messages because it was switched off in the same paging range and therefore, the system is informed of its location. The setting-up of a call will not, however, be successful because the telephone is not located in the receipt range of the base station.

(2) At this point, the telephone is able to initiate or to receive a call. The telephone need not be registered because it is still in the same paging range in which it was switched off.

(3) The telephone notifies that the signal of the paging range H1 starts to become weaker and that the signal of the paging range H2 is stronger. Now the telephone starts a search for the signal of the call channel of the base station at given intervals while still listening to the paging station H1.

(4) The telephone enters the receipt range of the base station. Now the telephone informs the system that it will move to the paging range H2, and starts to listen to the signal of the paging station H2. Since that moment the system guides the messages entering the telephone to the paging range H2.

(5) The number of the telephone is called. Since the telephone is not within the receipt range of the base station, it is not able to give a response. The A subscriber becomes tired of waiting and keys in a paging message and hangs up the telephone. After a while, the paging station H2 transmits a request to call to the mobile telephone which stores it in its short dialing memory.

(6) The telephone enters the receipt range of the base station and the user decides to give a response to the call request just received. The telephone number can be found directly in the short dialing memory of the telephone.

(7) The telephone gets out of the paging ranges and it is not able to receive messages. Hereafter, it will at appropriate intervals search for a paging signal.

(8) The telephone recognizes the signal of the paging range H1 but it is not able to inform the system thereof because it is not within the receipt range of the base station.

(9) A message is sent to the telephone but the system transmits it to the paging range H2 because the telephone was recognized there before this. However, the exchange stores the message in its own memory.

(10) The telephone informs the system that it entered the paging range H1. Hereby, the exchange transmits the telephone the just received paging message using the call channel. Since that moment the system transmits the paging messages to the telephone through the paging station H1.

(11) The telephone is switched off. The system may transmit paging messages on to the paging range H1 although the telephone is not receiving them.

As an application, the system of the invention is described in the following when using it in the closed and open forms. The open system can be implemented as a city network or a countryside network.

In the closed system the paging range covers the entire operational range. The exchange and the base stations are private.

As an example, an application of the closed system for use in an industrial installation:

The paging range covers a region e.g. with a radius of 30 kilometres, a subtransmitter of the paging transmitter being located in a densely populated area located in the neighbourhood outside said paging range. The base stations are positioned in factories. The operational radius of a base station is about 200 m, corresponding to the power used in the cordless system. In the present instance, there may by about 30 simultaneous external calls and about 50 internal calls. An external call occupies one channel, an internal call two channels. Thus, 80 channels are needed within the system, 30 whereof being in the most loaded base station. The closed system only has one paging range, because of which only the requests to call which remain in the exchange are put through.

The telephones are personal hand telephones with which a call can be made in all factory buildings. When moving between the buildings and outside in the city, the telephone receives pagings which can be discharged when back on the site.

Majority of the personnel live within the paging area so that call requests can be responded through a wire-connected network from home or the calls can be discharged when coming to the work place. If the telephone user lives outside the paging area, he has to read the arrived paging requests by registering the telephone.

An outgoing call can be made from one's own telephone on all sites.

The open system is characterized by an extremely extensive paging system, for instance national or multinational. The size of the paging range is such that only a fraction of the users move from one paging range to another every day.

The system offers paging services, an immediate speech contact within the base stations, and an automatic response call service. The level of services may vary from range to range as the paging range is more covering than that of the speech traffic. As concerns subscriber classes, a less expensive paging service and a speech service may also be distinguished. The system may be so constructed that the apparatus of the present CT2 system are completely utilizable if the specification of the speech channel is adapted to be the same. The paging services and the handling of the arriving call necessitates a device conforming to the new system.

The system may also be implemented in the form of a special city network in the manner of the CT system, requiring a dense base station coverage, but also in the form of an extremely economic countryside network of low service level.

The city network of the open network is a small cellular network in which a home base station need not be defined. The paging range is uniform, whereby no registration is needed. The paging operation may be so constructed that very few shadows are established therein, and that the coverage of the base station services may be selected to conform to the demand. The base station network may be a small cellular network, whereby the power range of the mobiles is of the order of 100 mW, or a cellular micro network, whereby the power range is of the order of a few milliwatts.

If the receipt ranges of the base stations are overlapped, it is possible, without interrupting the call, to move from one receipt range of the base station to another, hand over, elsewhere the system only warns of the switching off of the call.

A delayed response call (paging memory) improves the level of services even in a defective base station network.

In a city network, separate densely populated areas may be covered with the base stations within the range of a joint paging range.

The open system as a countryside network offers an economical alternative for implementing low service level. The entire area is typically covered with a paging network, the cities with a small or a micro cellular network, and in sparsely populated areas, the roads at intervals of e.g. 15 to 30 minute drives. The base stations are positioned in the marked parking sites because a mobile vehicle is able to travel over a receipt range during a call. The services of a countryside network consist primarily of requests to call and automatically reverse calls.

The open and the closed systems may also be combined. Private services employing a joint paging system may be included in an open system. Private base stations may be so defined in programs or using a private call channel that they show up in display only to the mobiles of the closed network. This kind of private service may be, for instance, an exchange of a company, whereby the enterprise buys a comprehensive paging service while attending itself to the telephone exchange within its own premises.

Operation through the open network may be allowed to the subscriber apparatus of the closed network outside the operating range of its own, but this may also be blocked.

The system and the procedure of the invention enables setting up a call between two mobile telephones so that an incoming call to a mobile telephone is possible and both mobile telephones can move from one receipt range of a base station to another during the establishing of the call, and during the call, so that the connection will not be switched off. Owing to the cellular system, one base station may serve several users. A significant characteristic feature is that even if the telephone were entirely switched off from use, or were located outside the paging range, the paging messages sent to it are stored in the exchange of the system, and no messages get lost.

It is obvious to a person skilled in the art to implement the system of the invention and the procedure for its use in a number of different ways, remaining, however, within the sphere of protection of the claims.

We claim:

1. A telephone system for establishing a connection between telephone devices of a first and a second user when a location of the telephone device of the second user is not known, comprising:

telephone devices of the first and second users, each of the telephone devices having a radio telephone with multiple channels and a pager for providing paging messages;

a paging network for transmitting paging messages between the telephone devices of said users, said paging network having at least two paging transmitters each establishing a respective paging range;

a cellular network for transmitting telephone calls between the telephone devices of said users, said cellular network having a plurality of base stations each with a receipt area for servicing the telephone devices located within range of the receipt area of said base stations, some of said base stations being located within at least one of said paging ranges; and at least one exchange associated with each of said base stations, said exchange being operative for setting up calls within the cellular network and for storing in a first memory said transmitted paging messages, said exchange storing the transmitted paging message in a first memory in response to an inability of the telephone device of said second user to receive the transmitted paging message when sent by the pager of the telephone device of the first user and thereafter transferring the stored paging message to said telephone device of said second user at a time when said telephone device of said second user can receive said paging message, said exchange comprising means for initiating a call from said telephone device of said second user to said telephone device of said first user by using said stored paging message when said telephone device of said first user has been switched off before connection is established between the telephone device of the second user and the exchange.

2. The system in accordance with claim 1 wherein said telephone device for the one user is provided with a display, keyboard, second memory and control unit, jointly used by said pager and mobile telephone.

3. The system in accordance with claim 1 wherein said cellular network further comprises means for transferring said call from a first of said plurality of base station to a second of said plurality of base stations when said respective receipt range of said first and second base stations overlap and means for alerting said users when said call cannot be transferred between said first and second base stations.

4. The system in accordance with claim 1 wherein said cellular network further comprises means for updating said control of said exchange when the portable telephone moves between a first and second of said paging ranges so that transmitted paging messages are transmitted to said second paging range.

5. The system in accordance with claim 1 wherein the system is connected to a public switching network.

6. The system in accordance with claim 1 wherein said cellular network further comprising means for sending said stored paging message to set up the connection between said first and said second user, when the telephone device of said second user contacts said exchange of said respective one of said base stations.

7. The system in accordance with claim 6 wherein said contacting is performed when said second user is in said predetermined range of said respective base station.

8. The system in accordance with claim 1 wherein said base station includes a call channel and a speech channel.

9. The system in accordance with claim 8 wherein said exchange comprises means for transmitting a call set up message from said first user on said call channel to said base station of said second user, when said second user is outside the ranges of the base station of the first user.

10. The system in accordance with claim 1 further including means for informing said exchange when said cellular telephone moves between said paging ranges during said call.

11. The system in accordance with claim 1 further comprising means for storing messages in a second memory of said pager.

12. A method of operating a telephone system for establishing a connection between telephone devices of a first and a second user, comprising the steps of:

initiating a call from the telephone device of a first user to a telephone device of a second user when a location of the telephone device of the second user is not known, the telephone devices each having a radio telephone and a pager for providing paging messages;

transmitting said paging messages between said users via a paging network, said paging network having a plurality of paging ranges;

accessing a selected cellular network via a selected one of a plurality of base stations, each of said base stations servicing the users located within a predetermined range of said base stations;

controlling the set up of said initiated call with at least one exchange associated with each of said plurality of base stations;

controlling said paging network by receiving said paging messages at said exchange;

storing said paging messages in said exchange in a first memory if the telephone device of said second user cannot receive said transmitted paging message;

transferring said stored paging message to said second user when said second user can receive such transferred paging message; and initiating a call by said exchange from said second user to said first user, by using said stored paging message, when said telephone device of said first user has been switched off before establishment of connection between said second user and said exchange.

13. The method in accordance with claim 12 further comprising the steps of:

transferring said call from a first of said plurality of base station to a second of said plurality of base stations when said respective predetermined range of said first and second base stations overlap, alerting said users when said call cannot be transferred between said first and second base stations.

14. The method in accordance with claim 12 further comprising the step of updating said control of said exchange when the portable telephone moves between a first and second of said paging ranges so that transmitted paging messages are transmitted to said second paging range.

15. The method in accordance with claim 12 further comprising the step of transmitting said stored paging message to set up the connection between said first and said second user when said exchange is contacted by said second user through said respective one of said base stations.

16. The method in accordance with claim 15 wherein said exchange is contacted when said second user is in said predetermined range of said respective base station.

17. The method in accordance with claim 12 further comprising the step of transmitting a call set up message from said first user on a call channel to said base station of said second user, when said second user is outside the system.

18. The method in accordance with claim 12 further comprising the step of informing said exchange when said cellular telephone moves between said paging ranges during said call.

19. The method in accordance with claim 12 further comprising the step of storing paging messages in a second memory of said pager.

* * * * *